US009443217B2

(12) United States Patent
Iyer

(10) Patent No.: US 9,443,217 B2
(45) Date of Patent: Sep. 13, 2016

(54) MANUFACTURING QUALITY INSPECTION AND ANALYTICS SYSTEM

(71) Applicant: Accenture Global Services Limited, Dublin (IE)

(72) Inventor: Venkatesh R. Iyer, Karnataka (IN)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 713 days.

(21) Appl. No.: 13/786,108

(22) Filed: Mar. 5, 2013

(65) Prior Publication Data

US 2014/0258326 A1    Sep. 11, 2014

(51) Int. Cl.
G06Q 10/00    (2012.01)
G06Q 10/06    (2012.01)

(52) U.S. Cl.
CPC .................. G06Q 10/06395 (2013.01)

(58) Field of Classification Search
CPC ....................................................... G06Q 10/06
USPC .............................................................. 705/28
See application file for complete search history.

(56) References Cited

U.S. PATENT DOCUMENTS

| | | | |
|---|---|---|---|
| 2002/0156597 A1* | 10/2002 | Kornowski, Jr. ...... | G01B 21/04 702/179 |
| 2003/0093288 A1* | 5/2003 | Imabeppu ............. | G06Q 10/10 705/1.1 |
| 2004/0186605 A1* | 9/2004 | Wu ....................... | G06Q 10/087 700/102 |
| 2005/0075968 A1* | 4/2005 | Apostolides ........... | G06Q 10/06 705/38 |
| 2005/0138060 A1* | 6/2005 | Scholl .................... | G06Q 10/06 |
| 2005/0246217 A1* | 11/2005 | Horn ...................... | G06Q 10/06 705/7.18 |
| 2006/0010001 A1* | 1/2006 | Hamelink .......... | G06Q 10/0639 705/7.38 |
| 2006/0116778 A1* | 6/2006 | Chiang .................. | G05B 15/02 700/51 |
| 2008/0021718 A1* | 1/2008 | Kaartinen ............ | G06Q 50/265 705/325 |
| 2008/0134073 A1* | 6/2008 | Bergantino ........ | G05B 19/0426 715/771 |
| 2009/0254460 A1* | 10/2009 | Farmer .................. | G06Q 10/06 705/28 |
| 2010/0153154 A1* | 6/2010 | Bergantino .......... | G06Q 10/063 705/7.11 |
| 2011/0054730 A1* | 3/2011 | Knight ................... | G07C 5/008 701/29.5 |
| 2011/0055205 A1* | 3/2011 | Scott ................ | G06Q 10/06395 707/722 |
| 2013/0151428 A1* | 6/2013 | Hesse .............. | G06Q 10/06395 705/318 |
| 2014/0013219 A1* | 1/2014 | Liu ...................... | G06F 17/2881 715/255 |
| 2014/0039648 A1* | 2/2014 | Boult ..................... | G05B 15/02 700/79 |

OTHER PUBLICATIONS

Article entitled "Occupational Safety & Health Administration", by the United States Department of Labor, dated Oct. 14, 2011.*
Article entitled "Outsourcing Evaluation Approach for an Information Systems Project", by Rosenthal, dated Aug. 2003.*
Article entitled "5 Mobile Apps from SAP Partners", by McIlvaine, dated Aug. 22, 2011.*

(Continued)

*Primary Examiner* — Mahesh Dwivedi
(74) *Attorney, Agent, or Firm* — Mannava & Kang, P.C.

(57) ABSTRACT

A quality inspection and analytics system may include a quality inspection module to receive the information for inspection lots and display the information for the inspection lots simultaneously in a scrollable screen via a user interface. The information for the inspection lots may include inspection metrics, expected values for the inspection metrics and measured values for the inspection metrics. The quality inspection module may receive a usage decision and store the usage decision. Also, the system may include a quality analytics module to execute causal analysis of rejected inspection lots based on the inspection lot information.

16 Claims, 12 Drawing Sheets

(56) References Cited

OTHER PUBLICATIONS

Article entitled "Using Digital Signatures in SAP QM to Meet Regulatory Requirements", by Dunlap, Copyright 2004.*
Examination Report for Australian Patent Application 2014201115, by Stopford, dated May 1, 2014.*
Examination Report for Australian Patent Application 2014201115, by Stopford, dated Sep. 5, 2014.*
Examination Report for Australian Patent Application 2014201115, by Stopford, dated Apr. 22, 2015.*
"Patent Examination Report No. 1" on AU Patent Application No. 2014201115, dated May 1, 2014, IP Australia, 7 pages.

* cited by examiner

FIG. 5

MANUFACTURING QUALITY INSPECTION AND ANALYTICS SYSTEM

BACKGROUND

Quality inspection for the manufacturing of goods may include analyzing materials and finished goods to make sure the materials and goods meet certain quality standards. The quality standards may be set by a manufacturer or in some cases a government organization depending on the goods being manufactured.

The quality assurance department for pharmaceutical manufacturing has the daunting job of maintaining rigid quality standards throughout the manufacturing process to ensure the manufactured pharmaceuticals meet government standards. Furthermore, the quality assurance processes should not cause a delay in manufacturing so the pharmaceuticals can be produced to meet the user demand for the pharmaceuticals.

BRIEF DESCRIPTION OF DRAWINGS

The embodiments of the invention are described in detail in the following description with reference to examples shown in the following figures.

FIGS. 4 and 5 illustrate screenshots that may be displayed via a user interface to select inspection lots;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A quality inspection and analytics system facilitates quality inspection of materials and finished goods in a manufacturing supply chain, and provides a causal analysis of quality inspection outcomes. The quality inspection and analytics system can provide a quality department with first-hand information on inspection parameters and facilitates rejecting, restricting or approving material batches for production release. The quality inspection and analytics application can analyze inspection data to determine progress of an inspection process within a plant. The quality inspection and analytics application may analyze inspection lots created, inspection results recorded and usage decisions to determine which segment of the inspection procedure is lagging or improving. Also, causal analysis can be performed to determine the leading causes of batch rejections and to compare internal processing with outsourced processing of materials for one or more manufacturing stages.

The quality inspection and analytics system may include an application executed on a mobile device in one example but also may be executed by other types of computer systems. An inspector may utilize the mobile application to facilitate quicker inspection of materials that allows for more responsive inventory management. For example, the quality inspection and analytics system may determine from an enterprise resource planning system or other system that unrestricted stock of materials is lagging behind production. The quality inspection and analytics system may generate notifications to the inspector that materials need to be inspected and approved at a faster pace to meet the production demand.

The quality inspection and analytics system is generally described below by way of example with respect to quality inspection and analysis for pharmaceutical manufacturing. However, the quality inspection and analytics system may be used in the manufacturing of other types of goods, such as chemical manufacturing, commodities processing such as for oil and gas, automobile manufacturing or the manufacturing of any type of good that utilizes quality inspection in one or more stages of the manufacturing. The stages of the manufacturing may include procurement, storage for processing, intermediate processing and finished good evaluation.

Figure 1:
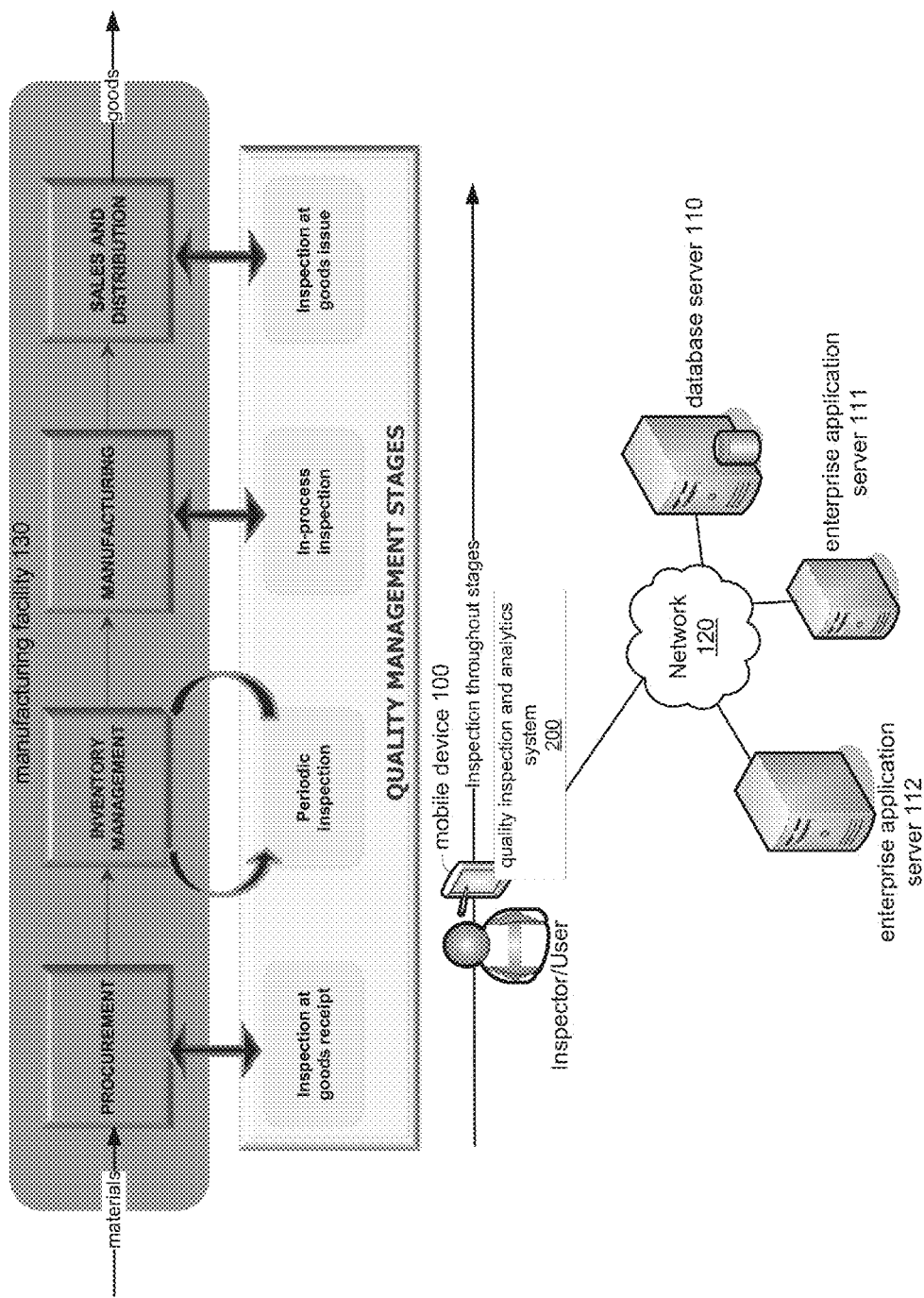
FIG. 1 illustrates a quality inspection and analytics system used in quality management stages throughout a manufacturing process.
Figure 2:
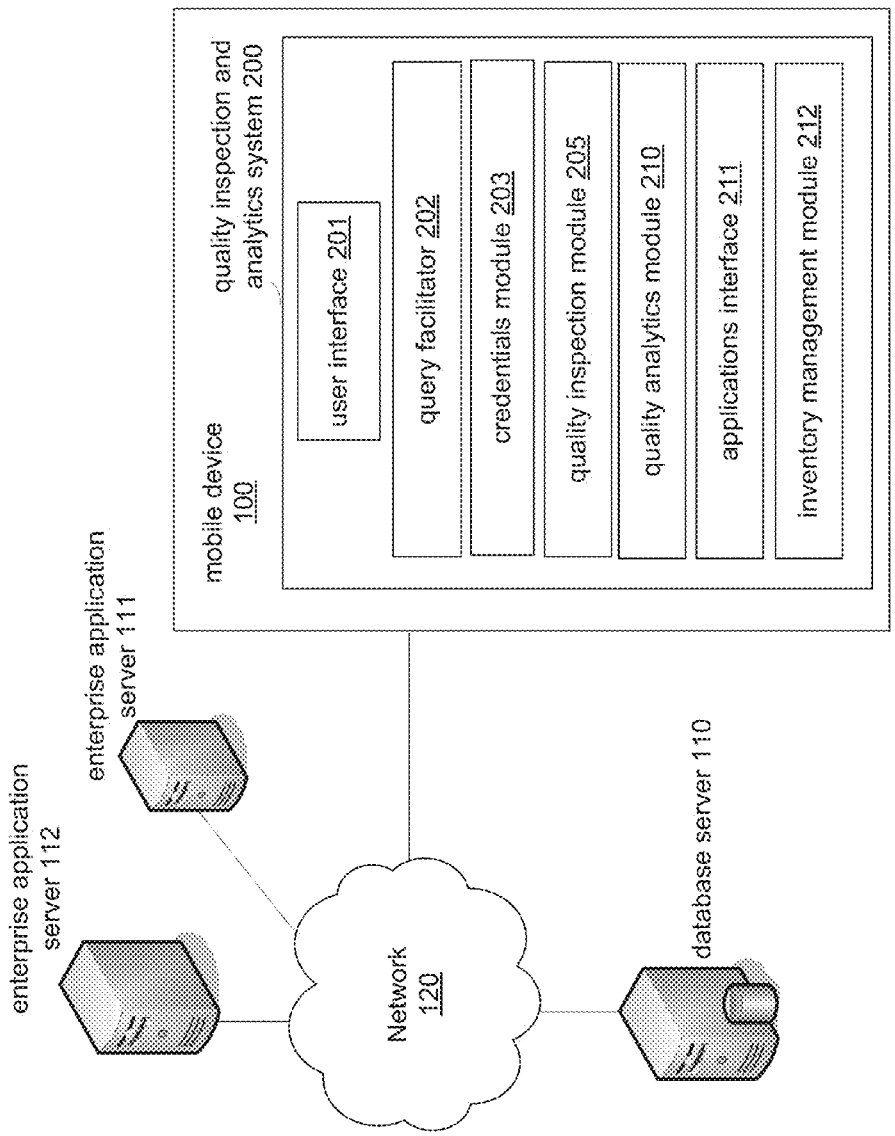
FIG. 2 illustrates a block diagram of the quality inspection and analytics system.

FIG. 1 illustrates a user, such as a quality inspector, using a quality inspection and analytics system 200, which may be executed on the mobile device 100, to perform inspections in a manufacturing facility 130. The manufacturing facility 130 may receive materials and create finished goods from the materials. For example, the manufacturing facility 130 may be a pharmaceuticals manufacturing plant and the materials may be chemicals for manufacturing pharmaceuticals. The materials may pass through different stages as the materials are processed to create the finished goods which may be pharmaceuticals. Different inspections may be performed at different quality management stages that correspond with different manufacturing stages. Examples of the manufacturing stages are shown and may include procurement, inventory management, manufacturing and sales and distribution. The inspector or multiple inspectors may perform inspections at the different stages. Also, each inspector may use a mobile device or other type of computer system to perform the inspections. The mobile device or the other type of computer systems include a quality inspection and analytics system, such as shown in FIG. 2, to facilitate inspections and analysis based on the inspections.

As shown in FIG. 1, in the procurement manufacturing stage, the materials are sourced and inspected upon receipt. In the inventory stage, inspections of the materials may be performed periodically. In the manufacturing stage, inspections may be performed throughout the manufacturing including intermediate phases of the manufacturing. In the sales and distribution stage, the final goods are inspected before being delivered to the buyer. Various quality assurance metrics may be used at different manufacturing stages.

Some metrics may be the same and some metrics may be different for the different stages. Examples of the metrics are further described below.

The quality inspection and analytics system 200 may be connected via a network 120 to backend systems, such as a database server 110 and enterprise applications hosted on enterprise servers 111 and 112. The network 120 may include a wired and/or a wireless network. The database server 110 may store inspection measurements and quality assurance usage decisions and any data used by the quality inspection and analytics system 200.

FIG. 2 shows a block diagram of the quality inspection and analytics system 200 which may be hosted by the mobile device 100. The quality inspection and analytics system 200 includes a user interface 201, a query facilitator 202, a credentials module 203, a quality inspection module 205, a quality analytics module 210, an applications interface 211, and an inventory management module 212. The components of the quality inspection and analytics system 200 may comprise software comprised of machine readable instructions.

The user interface 201 may comprise a graphical user interface that generates graphical screens on a display to display quality inspection information and receive user input. The query facilitator 202 generates query parameters based on input received from the users. The query parameters may include filtering options, such as a date range, selection of particular materials, lots or a plant, etc.

The credentials module 203 receives credentials of a user via the user interface 201 and provides the credentials to an enterprise system, which may be running on one of the enterprise application servers 111 and 112. For example, a user may enter their login ID and password via the user interface 201. The user's ID is used to retrieve their user profile, for example, from the database server 110. The profile may include information for the user such as a plant, inspection lots, batches and materials for the user if the user is an inspector. For example, an inspector may be assigned materials and lots of the materials to inspect. A lot may represent a specific amount of materials to inspect. The materials and lots may be assigned IDs and associated with the inspector's profile.

The quality inspection module 205 receives information for inspection lots associated with the user and may display the information for the inspection lots simultaneously in a scrollable screen via the user interface. The information for the inspection lots may include inspection metrics, expected values for the inspection metrics and measured values for the inspection metrics. For example, values for inspection metrics may be entered by an inspector during inspection of the lots and stored in the database server 110. The values may measure the quality of the lots. The quality inspection module 205 may retrieve the values and retrieve expected values from the database server 110, which may include threshold values for determining whether a lot passes quality analysis and present the values via the user interface 201. The quality inspection module 205 may receive, via the user interface 201, a selection of restricted, rejected or approved for each of the lots, and send the received selection and a timestamp, which may be a date and/or time for the selection, to the database server 110 for storage. For example, the user may view the measured and expected values for the inspection metrics via the user interface 101 and enter a usage decision for each lot, which may include whether the lot is accepted, rejected or restricted. Restricted may indicate that the lot may have failed to satisfy one or more of the expected values for the inspection metrics, but the lot may still be used to generate final goods in certain situations. In one example, a restricted lot may be used to create pharmaceuticals that are still effective but may have shorter shelf lives.

The quality inspection module 205 receives the usage decision for each lot and sends the usage decision for storage in the database server 110. The quality inspection module 205 may require the user's digital signature to store the usage decision, and the usage decision may be stored along with the timestamp and other information for the lot. Prior to displaying the inspection metrics to allow the user to make a usage decision, the quality inspection module 205 may determine for which lots that a usage decision is needed and display the inspection metrics for those lots so the user can select the usage decision.

Different inspection metrics may be used at different manufacturing stages to evaluate the quality of materials. The quality inspection module 205 may determine the current stage of manufacturing and select inspection metrics based on the current stage and display those inspection metrics. An enterprise application may track the current stage of manufacturing for the materials and provide an indication of the current stage of manufacturing to the quality inspection module 205. The quality inspection module 205 may use a predetermined set of inspection metrics for each stage.

The quality analytics module 210 may retrieve inspection lot information from the database server 110 and may compare the number of lots inspected to total number of lots created, determine a rate of inspection from the comparison and compare the rate of inspection to a benchmark to determine a level of progress for inspection lots assigned to a user. The quality analytics module 210 may also determine a number of usage results recorded for the inspection lots and number of usage decisions needed for the inspection lots to determine the rate of progress. The inspection lots selected for the comparison may be filtered for example by material and/or date range. The quality analytics module 210 may provide an indication of the level of progress via the user interface 201 and indications of the number of inspection lots created for a date range, number of usage results recorded for the inspection lots and number of usage decisions needed for the inspection lots.

In one example, the level of progress may be a color-coded indicator representing whether the user is on schedule (green), behind schedule (red) or in danger of falling behind schedule (yellow). The level of progress may be driven by the inventory management module 212. The inventory management module 212 determines whether the number of accepted inspection lots is sufficient to meet the manufacturing demand. If not, the user may need to increase the rate of inspection so a sufficient number of lots are available for the next phase of manufacturing. The inventory module 212 may determine whether the number of accepted inspection lots needs to be increased based on the manufacturing demand and adjust the indication of the level of progress accordingly. For example, the inventory management module 212 may determine whether a rate of release of batches of lots determined to be accepted matches a production rate. If the rate of batch release is less than the production rate, a notification may be generated to the user to increase lot inspection rate and display available inspection lots available for release. Also, restricted inspection lots that have a number of rejected parameters less than a threshold may be released. For example, an inspection lot may be marked as restricted if its color is not matching a predetermined color. However, if the color is close to the predetermined color, the batch may be released to keep up with production. The restricted lots may be displayed via the user interface 201 along with inspection metrics so the user can make a determination of whether to release the lots or not.

The quality analytics module 210 may also perform causal analysis from the inspection information. For example, the quality analytics module 210 determines a number of rejections for each of the inspection metrics for the inspection lots across multiple inspection types. An inspection type may include inspection metrics used for a particular manufacturing stage. The quality analytics module 210 may retrieve inspection information from the database server 110 to determine the number of rejections. The quality analytics module 210 can aggregate the rejections for each of the inspection metrics across all the inspection types and display the aggregated rejections for each of the inspection metrics in the user interface 201.

The quality analytics module 210 may compare rejections for in-house production to outsourced production and display an indication of the results of the comparison. For example, some material processing for a manufacturing stage may be outsourced to a contractor and some is performed by the manufacturing company. The number of rejected lots for the outsourced processing and the number of rejected lots for the in-house processing are determined and displayed via the user interface 201. The user can then quickly determine whether the outsourced production or the in-house production has more rejected lots and then make decisions on whether to increase or decrease outsourced or in-house production and/or further investigate the causes of the rejected lots to improve processing.

The applications interface module 211 formats data for use by other applications or by a database. For example, the applications interface module 211 may comprise one or more application program interfaces (APIs). An API for a database in the database server 110 may be used to format query parameters as required by the database and send the formatted query parameters to the database to retrieve information for inspection lots. An API may be used to communicate data to an enterprise application running on one of the enterprise application servers 111 or 112.

Figure 3:
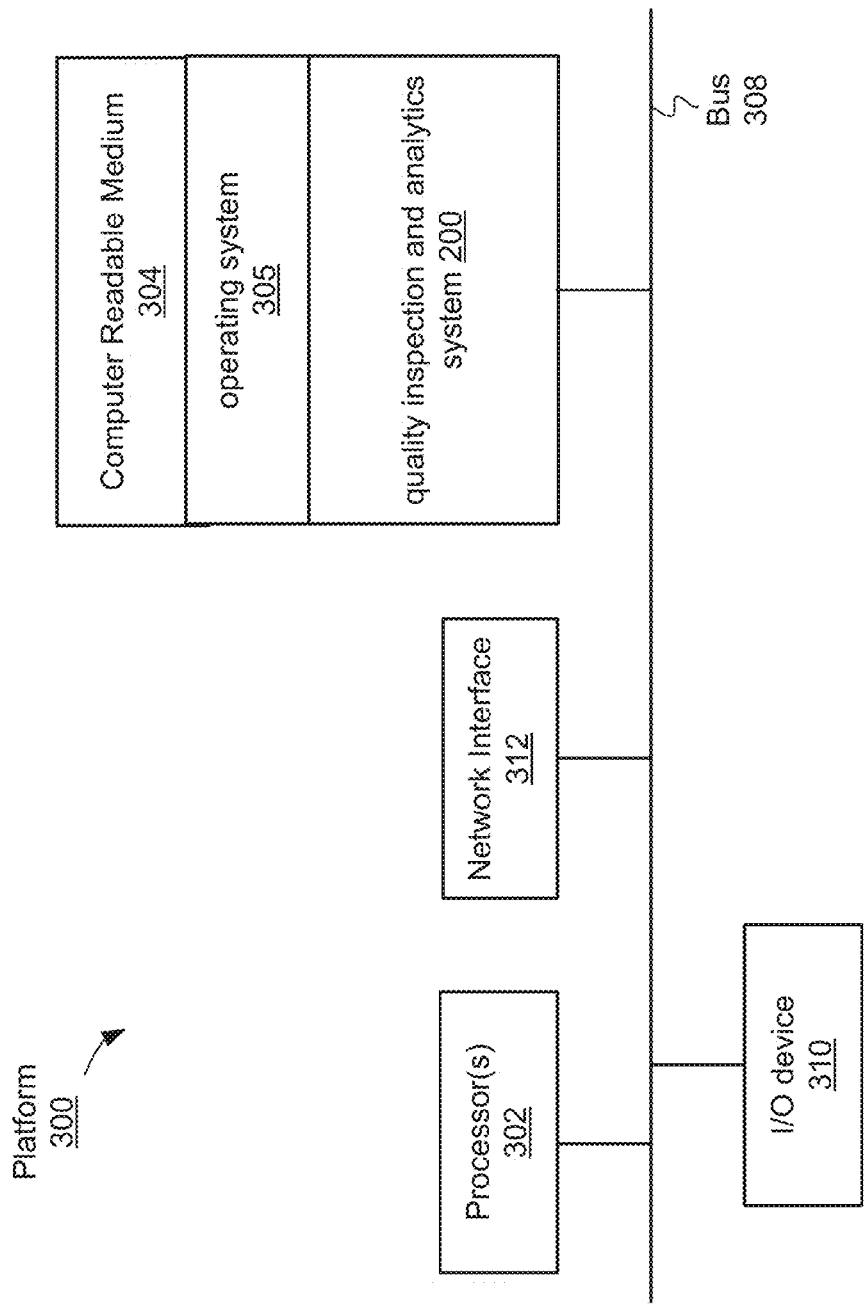
FIG. 3 illustrates a hardware platform for the quality inspection and analytics system.

FIG. 3 illustrates a hardware platform 300 for the quality inspection and analytics system 200. The hardware platform 300 may represent a platform for the mobile device 100 or any computer system that can host the quality inspection and analytics system 200. The hardware platform 300 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The hardware platform 300 includes a processor 302 that may execute machine readable instructions performing some or all of the methods, functions and other processes described herein. Commands and data from the processor 302 are communicated over a communication bus 308. The hardware platform 300 also includes a computer readable medium 304, such as a random access memory (RAM), where machine readable instructions and data for the processor 302 may reside during runtime, and/or a data storage which may be non-volatile and stores machine readable instructions and data. An operating system 305 and the quality inspection and analytics system 200 are shown as being stored in the computer readable medium 304. The quality inspection and analytics system 200 may be an application running on the operating system 305.

The hardware platform 300 may include an I/O device 310, such as a keyboard, a mouse, a display, etc. The hardware platform 300 may include a network interface 312 for connecting to a network, such as the network 120. Other known electronic components may be added or substituted in the computer system 300.

Figure 4:
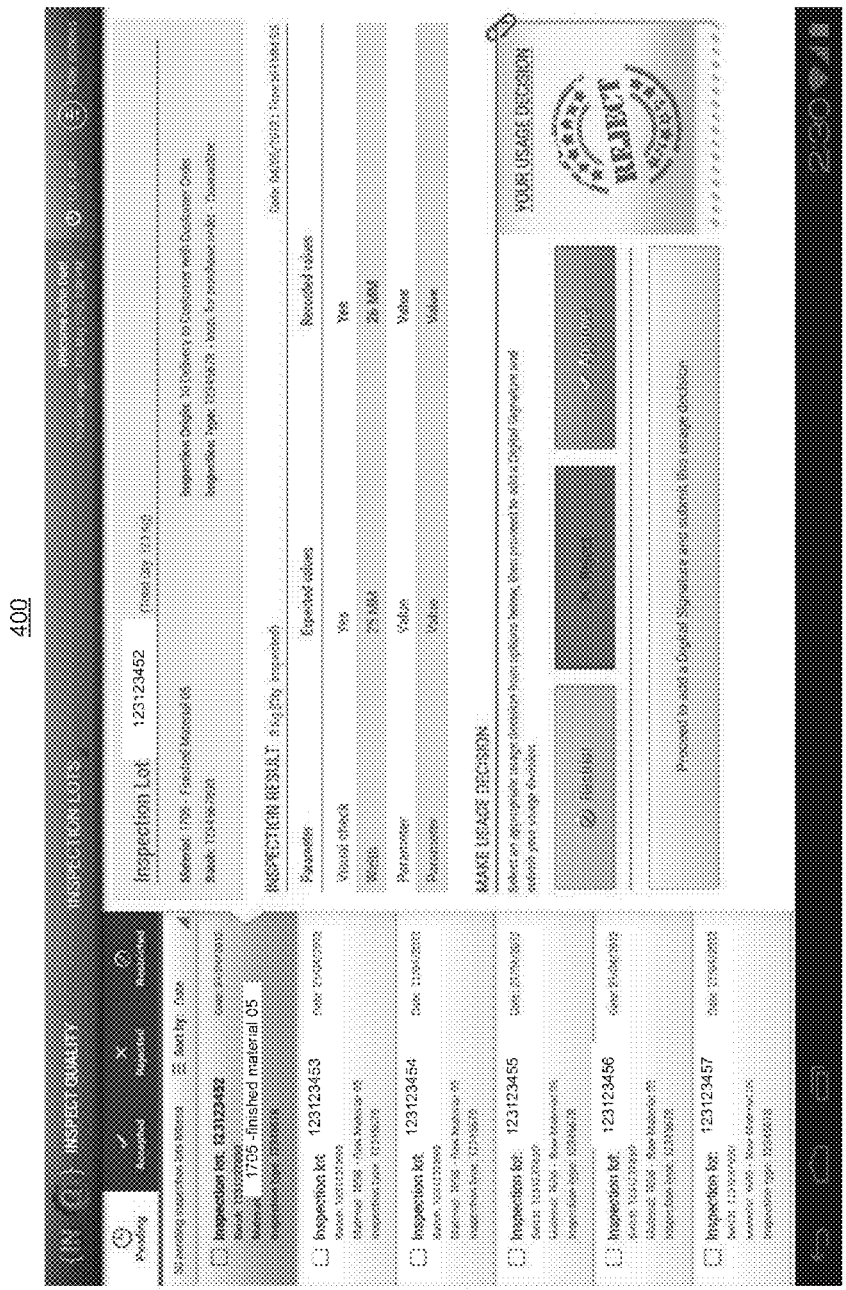
Figure 5:
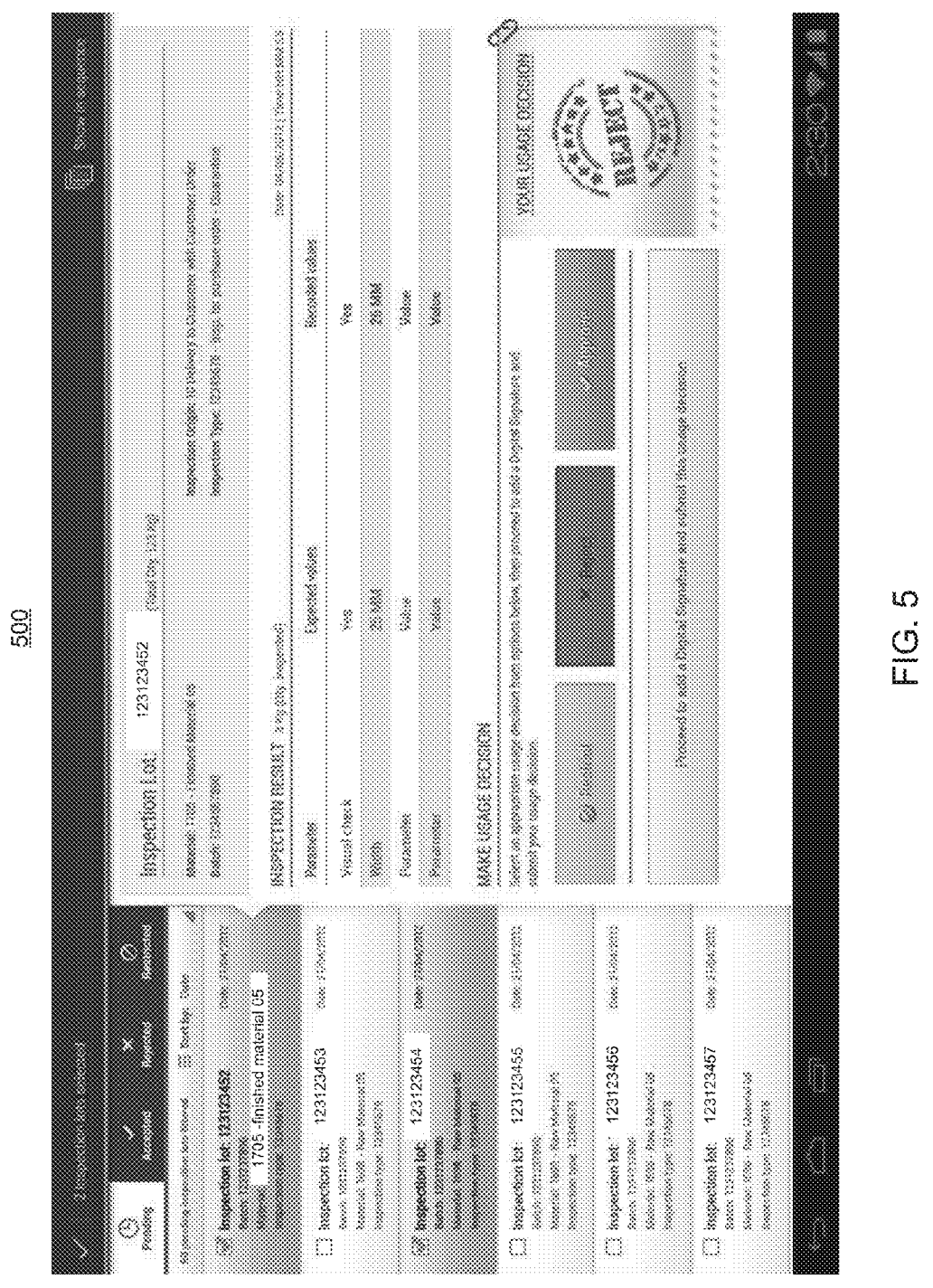

A user may login to the quality inspection and analytics system 200 via the user interface 201. After logging into the quality inspection and analytics system 200, the quality inspection and analytics system 200 may facilitate making usage decisions via the user interface 201. As discussed above, the quality inspection module 205 allows a user to make usage decisions for inspection lots. FIGS. 4 and 5 show examples of screenshots that may be generated by the quality inspection module 205 via the user interface 201 to facilitate making usage decisions. FIG. 4 shows an example of a screenshot 400 for viewing and selecting inspection lots. On the left side of the screenshot 400, the user may select the pending button to view the list of inspection lots pending a usage decision. In the screenshot 400, the user may also select the accepted, rejected or restricted buttons to view the inspection lots that are accepted, rejected or restricted. The inspection lots shown may be lots that meet filter criteria set by the user. The user may select filter criteria through the user interface 201 to display a list of inspection lots that meet the filter criteria and that are pending a usage decision. Examples of the filter criteria may include selection of particular plant, a date range (e.g., show inspection lots pending decision for the last 10 days), selection of particular batches that contain inspection lots, etc. In this example, 50 inspection lots meet the filter criteria and are pending a usage decision, and the list of the 50 inspection lots is shown on the left side. The inspection lots may be sorted by date. Information may be shown for each inspection lot, such as inspection lot ID, batch ID of the batch containing the inspection lot, material ID of the material in the inspection lot, inspection type, and date that the inspection lot was made available for the usage decision.

On the right side of the screenshot 400 is where additional information for each inspection lot is displayed. The additional information may include the inspection results, which may include measured values for inspection metrics for the particular inspection type. "Parameter" represents the inspection metrics. "Expected values" represents the benchmarks for the inspection metrics. "Recorded values" represents the measured values for each inspection metric. The user may compare the recorded values with the expected values to make the usage decision.

Figure 6:
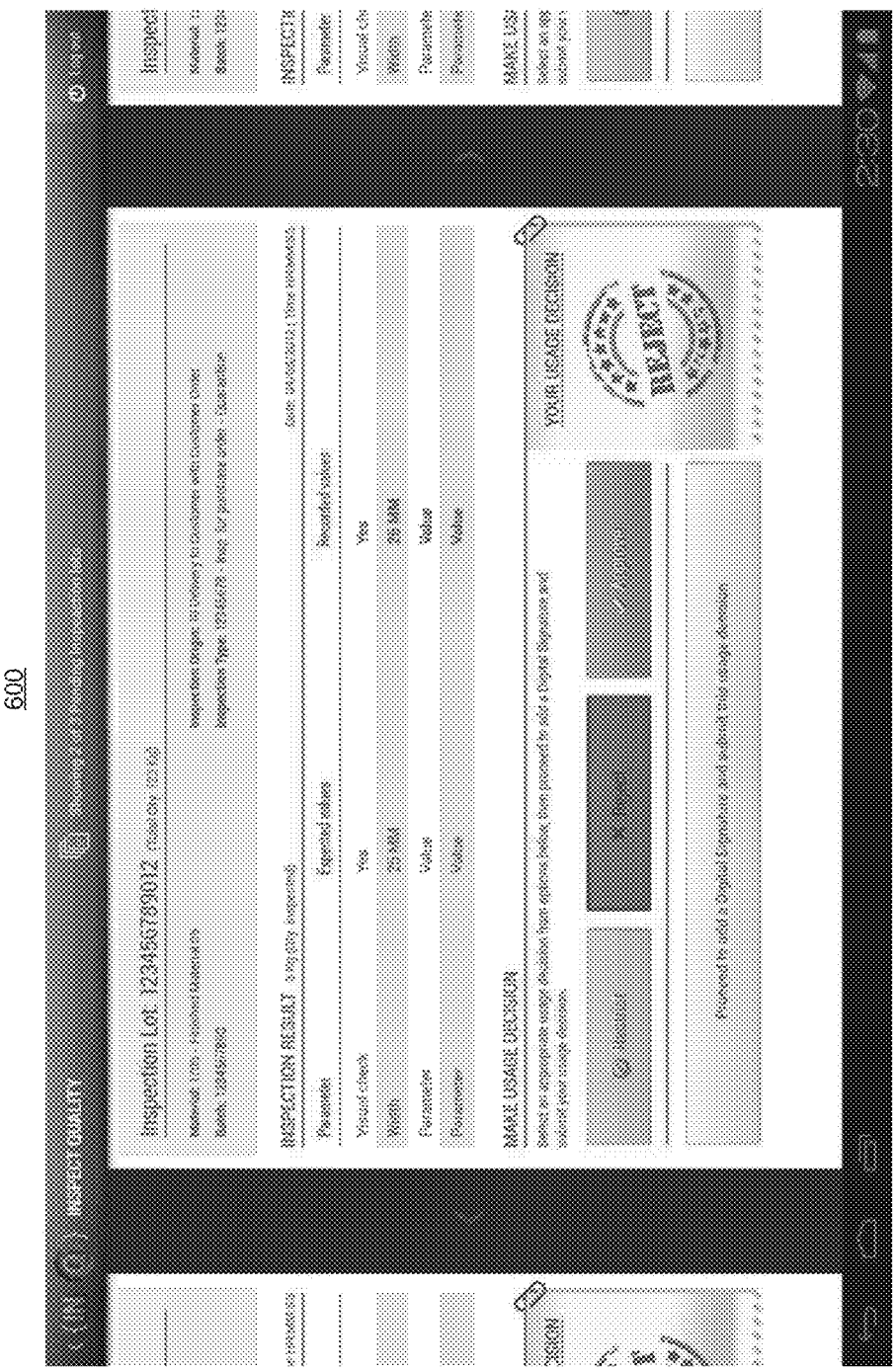
FIG. 6 illustrates a screenshot that may be displayed via the user interface to facilitate making usage decisions for selected inspection lots.

From the screenshot 400, the user may select inspection lots from the list of inspection lots to make the usage decision. FIG. 5 shows an example of a screenshot 500 whereby inspection lots are selected by clicking the box for each of the inspection lots that are desired to be selected for making a usage decision. Assume three inspection lots are selected. FIG. 6 shows an example of a screenshot 600 whereby information for the selected inspection lots is shown and the user can make a usage decision by clicking on the "Restrict", "Reject" or "Approve" button for example based on a comparison of the expected and recorded values for each inspection metric. The user may need to add their digital signature to submit the usage decision. Information for all the selected inspection lots is displayed simultaneously in a scrollable screen via the user interface 201. For example, the user may scroll to the right or to the left to switch between different inspection lots to make the usage decision.

The quality inspection module 205 can analyze inspection data to determine progress of an inspection process within a plant. The quality inspection module 205 may analyze inspection lots created, inspection results recorded and usage decisions to determine which segment of the inspection procedure is lagging or improving. Also, causation analysis can be performed to determine the leading causes of inspection lot rejections and to compare internal processing with outsourced processing of materials for one or more manufacturing stages. The user may select filter criteria via the user interface 201 to select inspect lots to analyze. For example, the user may select a plant and a date range and the quality inspection module 205 retrieves information for inspection lots from the database server 110 that match the filter criteria for analysis.

Figure 7:
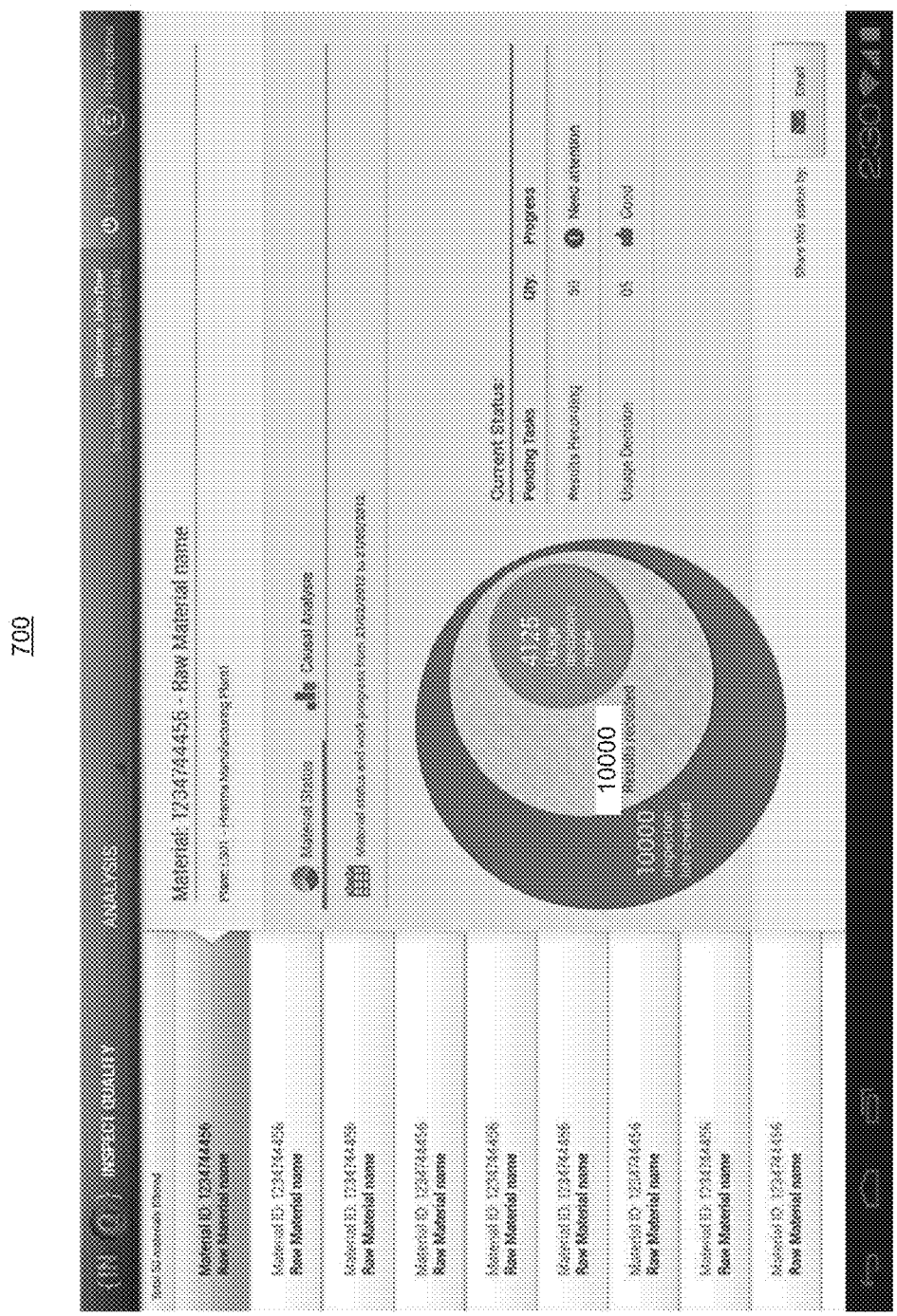
FIG. 7 illustrates a screenshot that may be displayed via the user interface to show material status and usage decision progress.

FIG. 7 shows an example of a screenshot 700 showing inspection progress for inspection lots. In this example, an overall material and inspection progress are shown for a particular material. For example, for this material, 10,000 inspection lots have been created and inspection results have been recorded for all the inspection lots. However, only 4,125 usage decisions have been made for the inspection lots.

Also shown in the screenshot 700 are the progress results for the inspection lots that meet the filter criteria. For example, 50 inspection lots for the material meet the filter criteria. Inspection results have been recorded for the 50 inspection lots but the progress is shown as "Need attention" because only 5 inspection lots currently have a usage decision.

Figure 8:
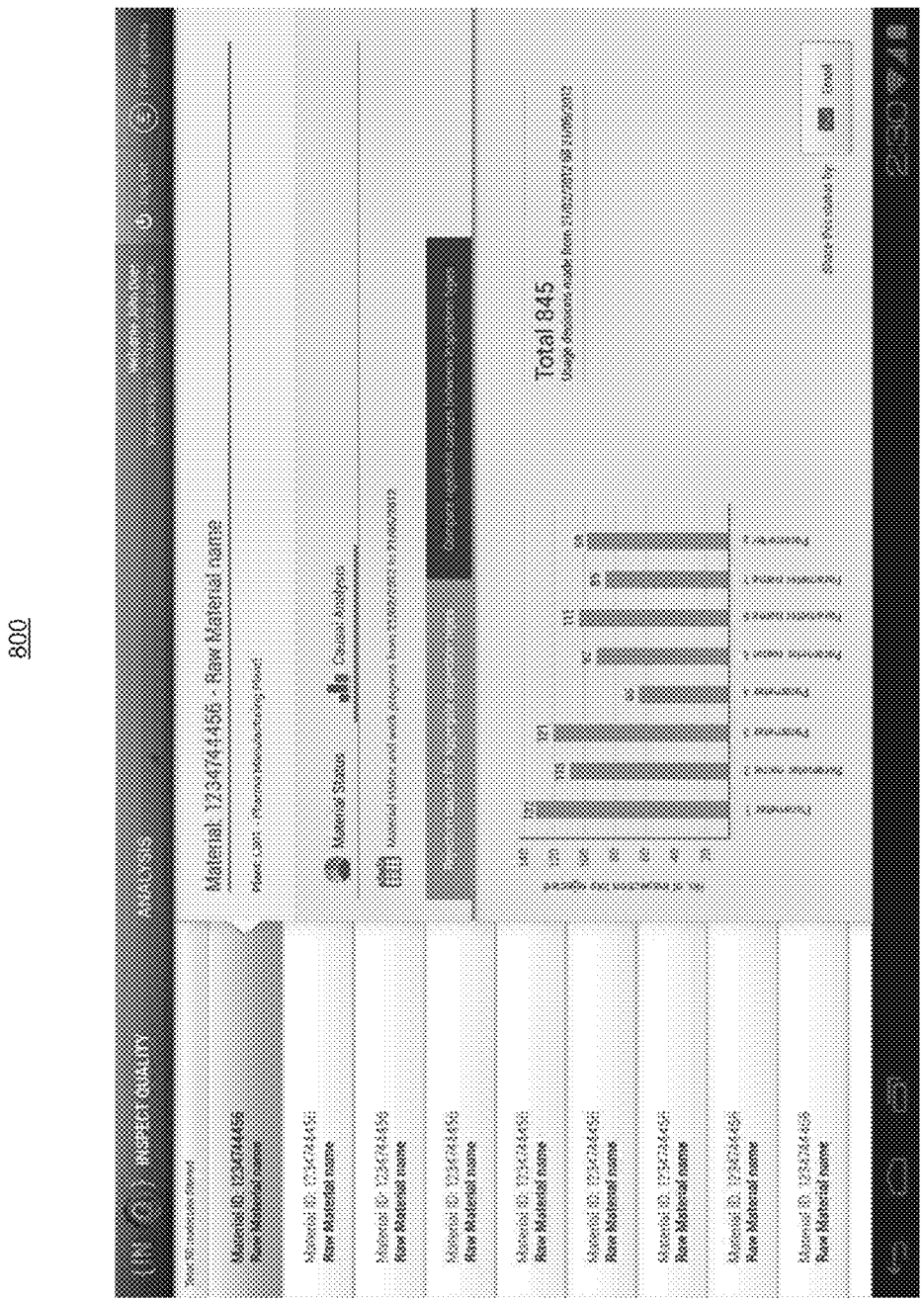
FIGS. 8 and 9 illustrate screenshots that may be displayed via the user interface to show causal analysis of rejections.
Figure 9:
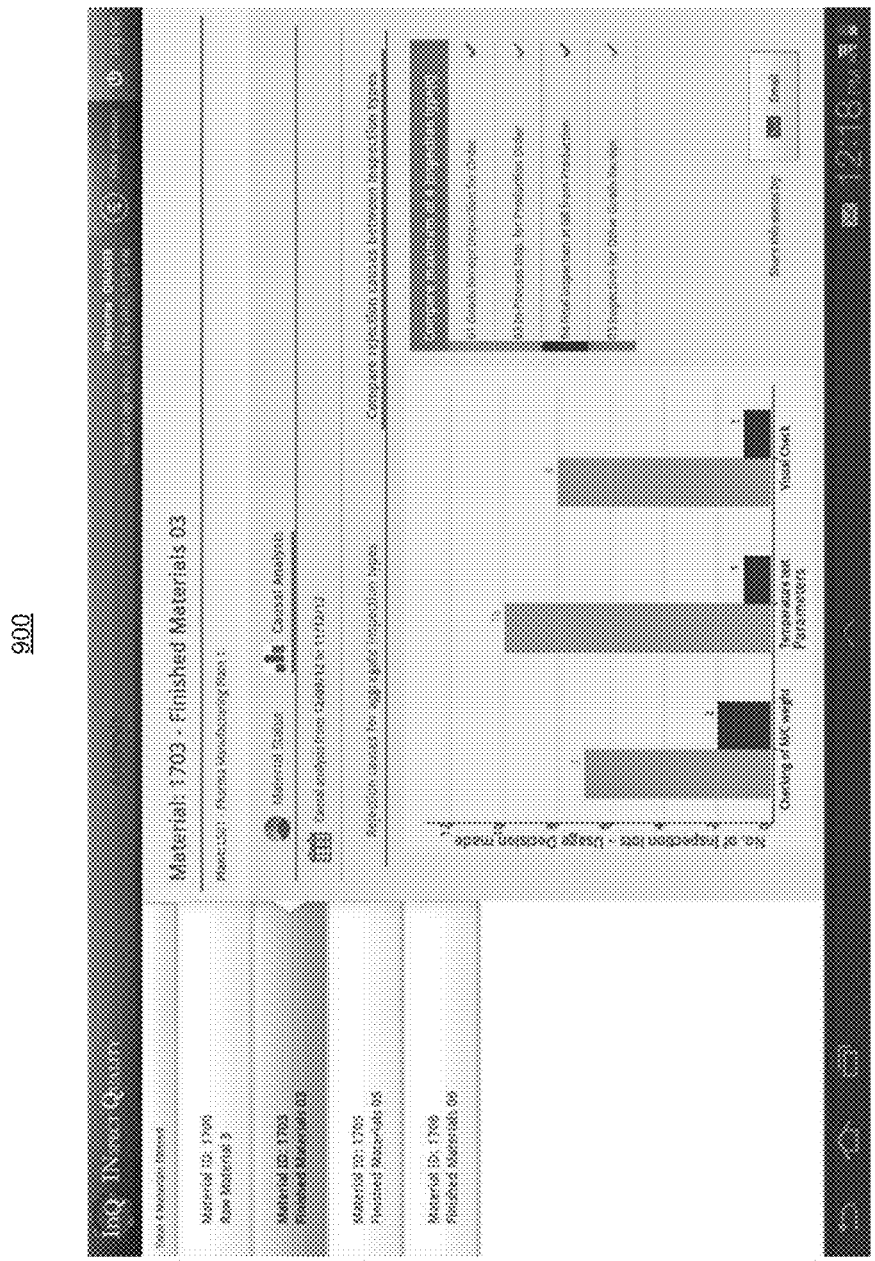

FIGS. 8 and 9 show examples of causal analysis screenshots 800 and 900. Screenshot 800 in FIG. 8 shows an aggregation of inspection lot rejections for each inspection metric (e.g., parameters 1-8). The rejections are shown for the usage decisions for inspection lots that fall within a selected date range or meet other filter criteria which may be selected by the user. For example, 845 usage decisions were made for inspection lots of a selected material that fall within a selected date range. From the 845 usage decisions, there were 132 rejections due to parameter 1, 115 rejections due to parameter 2, and so on. From the screenshot 800, the user can quickly identify top causes for rejections and implement remedial measures to improve quality based on the causes. For example, if parameter 1 is for width of the tablet, then manufacturing machines and processes responsible for the width may be checked before manufacturing the next batch.

The screenshot 900 in FIG. 9 also shows an aggregation of inspection lot rejections for each inspection metric. However, the inspection types may be selected and the inspection metrics are shown for the selected inspection types. Different inspection types may have different sets of inspection metrics but some of the inspection metrics may be used for multiple inspection types. In the example shown in FIG. 9, the inspection metrics for the selected inspection types include moisture content (M/C) weight, temperature, and visual check. The temperature may be a melting point or a freezing point. The visual check may include a color test to determine whether the material in the inspection lot is a predetermined color.

The histograms in FIG. 9 show the number of rejections for each inspection metric across the inspection types and the inspection lots selected for causation analysis. Also, the histograms show the source of the materials. For example, two bars are shown for each inspection metric. One bar represents rejections for in-house processing of the material and the other bar represents rejections for outsourced production of the material. For example, 7 rejections for the outsourced production were caused by the moisture content weight but only 2 rejections for the in-house production were caused by the moisture content weight. 8 rejections for the outsourced production were caused by the visual check but only 1 rejections for the in-house production was caused by the visual check.

Figure 10:
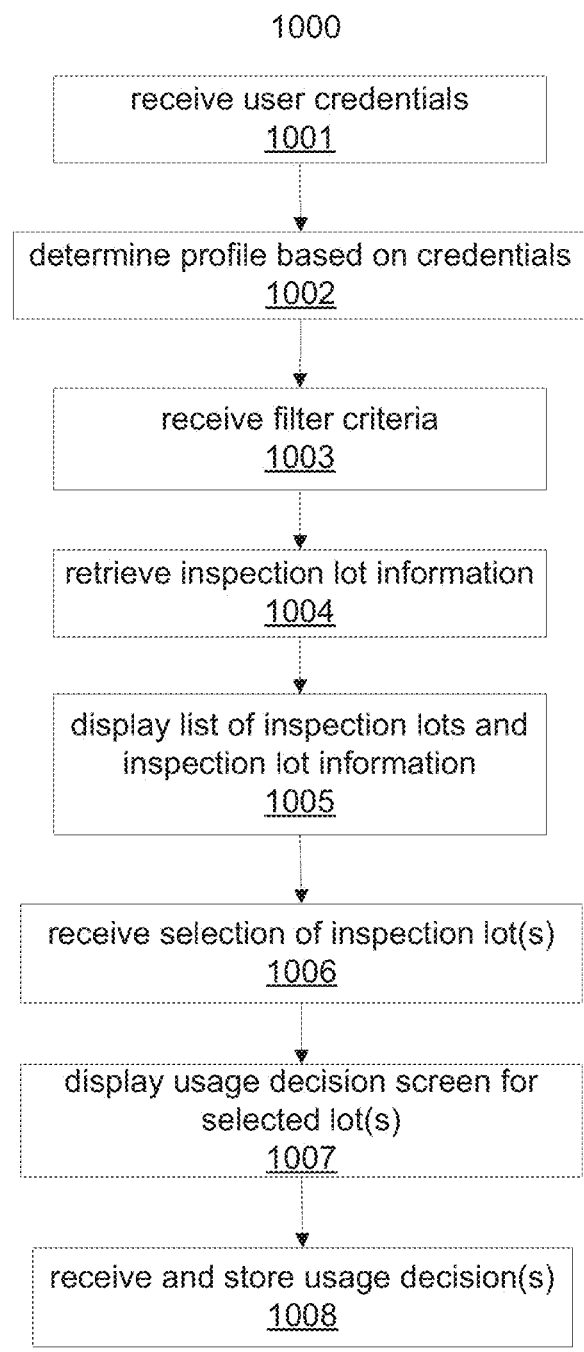
FIG. 10 illustrates a flowchart of a method for quality inspection.

FIG. 10 shows a method 1000 for quality inspection. The method 1000 and other methods described herein are described by way of example with respect to the quality inspection and analytics system 200 shown in FIGS. 1-3. The methods may be performed by other systems.

At 1001, the quality inspection and analytics system 200 receives credentials for a user. The user may be a quality inspector responsible for making usage decisions for materials in a manufacturing process. The credentials may include a login ID and password entered by the user.

At 1002, the quality inspection and analytics system 200 determines a profile for the user. For example, the credentials module 203 receives the credentials entered by the user via the user interface 201 and the quality inspection module 205 retrieves the user profile from the database server 110 for the user that matches the credentials. The profile may include information for the user such as a plant, inspection lots, batches and materials for the user.

At 1003, filter criteria are received at the quality inspection and analytics system 200. For example, the user enters filter criteria via the user interface 201, such as material, date range, batch, etc.

At 1004, the quality inspection and analytics system 200 retrieves from the database server 110 information for inspection lots that are assigned to the user's profile and that satisfy the filter criteria. For example, the query facilitator 202 generates query parameters comprised of the filter criteria. The applications interface 211 may be used to generate and send a query to the database server 110 with the query parameters to retrieve the information for the inspection lots.

At 1005, a list of the inspection lots and the information for the inspection lots retrieved at 1004 are displayed via the user interface 201. FIG. 4 shows the screenshot 400 displaying the list and inspection lot information. The quality inspection module 205 may determine whether a usage decision has been made for inspection lots assigned to the user and display only the inspection lots for which no decision has been made. The information retrieved from the database server 110 may indicate whether a usage decision has been made.

At 1006, a selection of one or more of the inspection lots is received at the quality inspection and analytics system 200. For example, as shown in the screenshot 500 in FIG. 5, one or more of the inspection lots may be selected via the user interface 201. The selection is made for inspection lots for which the usage decision has not been made. The selection may include a subset of the pending inspection lots for the user or all the pending inspection lots for the user.

At 1007, a usage decision screen is displayed for the selected inspection lots. The screenshot 600 in FIG. 6 shows an example of simultaneously displaying usage decision information for the selected inspection lots in a scrollable screen. The displayed usage decision information may include inspection metrics for a particular inspection type and expected and recorded values for the inspection metrics. The inspection metrics displayed for an inspection lot may be based on the current stage of manufacturing. For example, different inspection types may be used for different stages of manufacturing. The inspection metrics for the inspection type for the current stage of manufacturing are displayed.

At 1008, the quality inspection and analytics system 200 receives the usage decisions for the displayed inspection lots. For example, the user enters "accept", "restrict" or "reject" for each inspection lot and the usage decision is stored in the database server 110 along with a timestamp indicating when the usage decision was made.

A restricted lot may later be accepted. For example, a restricted lot may fail the quality standards of one country but pass the quality standards for another country. The restricted lot may be re-labeled as accepted and packaged and sent to the other country for sale.

Figure 11:
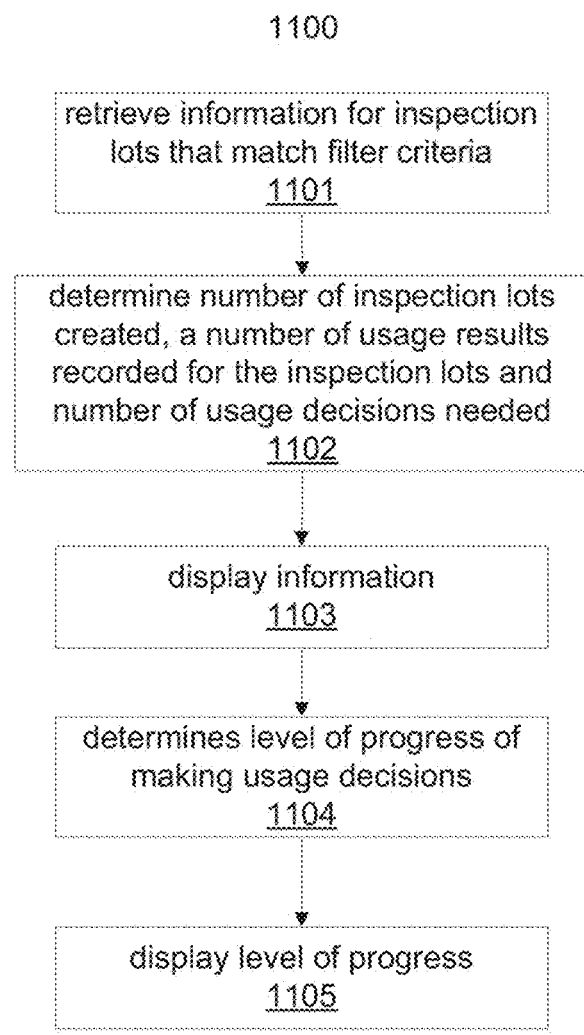
FIG. 11 illustrates a flowchart of a method for analyzing inspection lot information.

FIG. 11 shows a method 1100 for analyzing inspection lot information. At 1101, the quality inspection and analytics system 200 retrieves information from the database server 110 for inspection lots. A user may select filter criteria and information for the inspection lots are retrieved that match the filter criteria. The query facilitator 202 may generate the query including the filter criteria and the application interlace 211 may format the query to send to the database server 110 to retrieve the matching inspection lot information. The filter criteria may include material, date range, etc.

At 1102, the quality analytics module 210 determines from the retrieved inspection lot information, a number of inspection lots created, a number of usage results recorded for the inspection lots and number of usage decisions needed for the inspection lots and displays the information at 1103 via the user interface 201, such as shown in FIG. 7.

At 1104, the quality analytics module 210 determines a level of progress of making usage decisions and displays the level of progress at 1105 via the user interface 201. For example, as shown in FIG. 7, 50 inspection lots need usage decisions so the level of progress is need attention. The level of progress may be determined by comparing the number of usage decisions made with an expected number.

Figure 12:
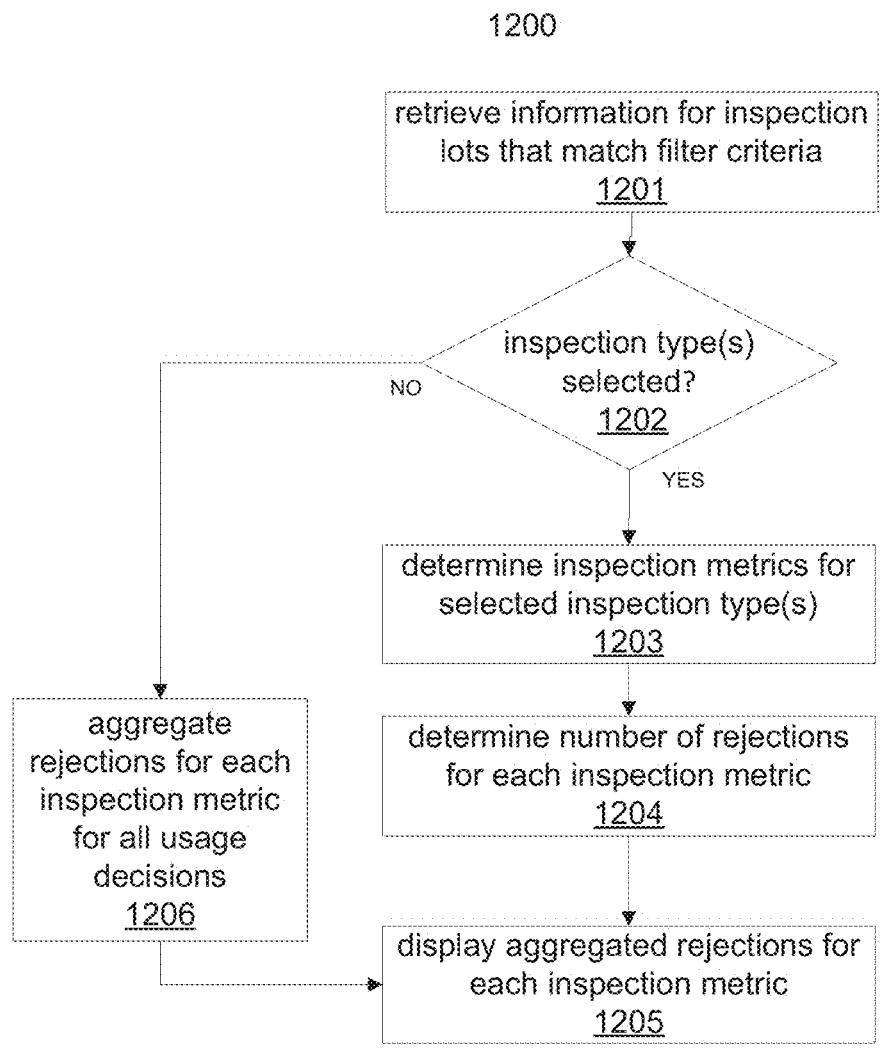
FIG. 12 illustrates a flowchart of a method hod for generating causal analysis information for inspection lots.

FIG. 12 shows a method 1200 for generating causal analysis information for inspection lots. At 1201, inspection lot information is retrieved from the database server 110 for inspection lots matching filter criteria.

At 1202, the quality analytics module 210 determines whether one or more inspection types have been selected. For example, a user may select inspection types via the user interface 201. At 1203, if one or more inspection types are selected, the quality analytics module 210 determines inspection metrics for the selected inspection types. The inspection metrics for each inspection type may be predetermined and stored in the database server 110. At 1204, a number of rejections is determined for each inspection metric determined at 1203. For example, the rejections for each of the inspection lots from 1201 are aggregated for each inspection metric. At 1205, the aggregated rejections are displayed for each inspection metric, such as shown in FIG. 9.

At 1206, if one or more inspection are not selected, the quality analytics module 210 aggregates the rejections for each inspection metric for all the usage decisions made during a date range if a date range is selected as a filter criteria. The aggregated rejections are displayed at 1205, such as shown in FIG. 8.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A quality inspection and analytics system comprising:
a hardware processor; and
a memory on which is stored machine readable instructions that are to cause the hardware processor to implement:
a credentials module to receive credentials for a user, wherein a profile is retrieved for the user based on the credentials and the profile is associated with a plant, inspection lots, batches and materials for the user;
a user interface to receive input parameters, wherein the input parameters identify a plurality of inspection lots from the inspection lots associated with the profile and the input parameters include a date range for the inspection lots;
a query facilitator to generate query parameters based on the input parameters;
an application interface to format the query parameters to be used by a database and send the formatted query parameters to the database to retrieve information for the plurality of inspection lots;
a quality inspection module, executed by a processor, to receive the information for the plurality of inspection lots and display the information for the plurality of inspection lots simultaneously in a scrollable screen via the user interface, wherein the information for the plurality of inspection lots includes for each of the plurality of inspection lots, inspection metrics, expected values for the inspection metrics and measured values for the inspection metrics,
wherein the quality inspection module is further to:
identify a query parameter comprised of the date range and only display information for inspection lots within the date range; and
receive, via the user interface, a selection of restricted, rejected or approved for each of the plurality of inspection lots, and send the received selection and timestamp for the selection to the database via the database interface with the user's digital signature to store the selection and the timestamp in the database with the information for the plurality of inspection lots; and
an inventory management module to determine whether a rate of batch release matches a production rate, and in response to a determination that the rate of batch release is less than the production rate, generate a notification to the user, wherein the notification to the user is a notification to increase lot inspection rate, display available inspection lots available for release, and display restricted inspection lots that have a number of rejected parameters less than a threshold.

2. The quality inspection and analytics system of claim 1, wherein the quality inspection module is further to determine whether a usage decision has been made for each of the inspection lots and only display information for the inspection lots for which a usage decision has not been made, wherein the usage decision comprises restricted, rejected or approved.

3. The quality inspection and analytics system of claim 1, wherein the quality inspection module is further to determine a stage of manufacturing for each of the plurality of inspection lots and select the inspection metrics for each of the plurality of inspection lots based on the stage of manufacturing for each of the plurality of inspection lots.

4. The quality inspection and analytics system of claim 1, wherein the information for the plurality of inspection lots comprises material, a batch in which the material is available for inspection, and inspection type.

5. The quality inspection and analytics system of claim 1, further comprising a quality analytics module to
retrieve inspection lot information from the database for inspection lots assigned to the user, wherein the inspection lots are for one or more materials and are for the date range,
determine, from the retrieved inspection lot information, a number of inspection lots created for the date range, number of usage results recorded for the inspection lots and number of usage decisions needed for the inspection lots,
determine a level of progress of determining usage results based on comparison of the inspection lot information to benchmarks, and
provide an indication of the level of progress via the user interface and indications of the number of inspection lots created for the date range, number of usage results recorded for the inspection lots and number of usage decisions needed for the inspection lots.

6. The quality inspection and analytics system of claim 1, wherein the hardware processor is to implement a quality analytics module to
retrieve inspection lot information from the database for inspection lots assigned to the user, wherein the inspection lots are for one or more materials and are for the date range,
determine a number of rejections for each of the inspection metrics for the inspection lots across a plurality of inspection types, wherein an inspection type comprises a subset of the inspection metrics used for a particular manufacturing stage, and
aggregate the rejections for each of the inspection metrics across all the inspection types and display the aggregated rejections for each of the inspection metrics in the user interface.

7. The quality inspection and analytics system of claim 6, wherein the quality analytics module is further to
receive selection of a subset of the inspection types,
determine a number of rejections for each inspection metric in each of the selected inspection types, and
display via the user interface an indication of the number of rejections for each inspection metric and for each of the selected inspection types.

8. The quality inspection and analytics system of claim 7, wherein the quality analytics module is further to compare rejections for in-house production to outsourced production and display an indication of the results of the comparison.

9. A method for quality inspection and analysis of quality inspection for manufacturing of goods, the method executed by a hardware processor executing machine readable instructions, the method comprising:
receiving credentials of a user;
determining a profile for the user based on the credentials, wherein the profile is associated with a plant, inspection lots, batches and materials for the user;
receiving input parameters, wherein the input parameters identify a plurality of inspection lots from the inspection lots associated with the profile and the input parameters include a date range for the inspection lots;
generating query parameters based on the input parameters, wherein generating query parameters includes identifying a query parameter comprised of the date range and only display information for inspection lots within the date range;
sending a query including the formatted query parameters to a database to retrieve information for the plurality of inspection lots;
displaying, by the hardware processor, the information for the plurality of inspection lots simultaneously in a scrollable screen via a graphical user interface on a device, wherein the information for the plurality of inspection lots includes for each of the plurality of inspection lots, inspection metrics, expected values for the inspection metrics and measured values for the inspection metrics;
receiving, via the user interface, a selection of restricted, rejected or approved for each of the plurality of inspection lots;
sending the received selection and timestamp for the selection to the database with the user's digital signature to store the selection and the timestamp in the database with the information for the plurality of inspection lots;
determine whether a rate of batch release matches a production rate; and
in response to a determination that the rate of batch release is less than the production rate, generating a notification to the user, wherein the notification to the user is a notification to increase lot inspection rate, display available inspection lots available for release, and display restricted inspection lots that have a number of rejected parameters less than a threshold.

10. The method of claim 9, further comprising:
determining whether a usage decision has been made for each of the inspection lots, wherein the displaying of the information for the plurality of inspection lots comprises displaying information for the inspection lots for which a usage decision has not been made, wherein the usage decision comprises a restricted, rejected or approved decision.

11. The method of claim 9, further comprising:
determining a stage of manufacturing for each of the plurality of inspection lots; and
selecting the inspection metrics for each of the plurality of inspection lots based on the stage of manufacturing for each of the plurality of inspection lots.

12. The method of claim 9, wherein the information for the plurality of inspection lots comprises material, at least one batch in which the material is available for inspection, and inspection type.

13. The method of claim 9, further comprising:
retrieving inspection lot information from the database for inspection lots assigned to the user, wherein the inspection lots are for one or more materials and are for the date range;

determining, from the retrieved inspection lot information, a number of inspection lots created for the date range, number of usage results recorded for the inspection lots and number of usage decisions needed for the inspection lots;

determining a level of progress of determining usage results based on comparison of the inspection lot information to benchmarks; and providing an indication of the level of progress via the user interface and indications of the number of inspection lots created for the date range, number of usage results recorded for the inspection lots and number of usage decisions needed for the inspection lots.

14. The method of claim 9, further comprising:

retrieving inspection lot information from the database for inspection lots assigned to the user, wherein the inspection lots are for one or more materials and are for the date range;

determining a number of rejections for each of the inspection metrics for the inspection lots across a plurality of inspection types, wherein an inspection type comprises a subset of the inspection metrics used for a particular manufacturing stage; and aggregating the rejections for each of the inspection metrics across all the inspection types and displaying the aggregated rejections for each of the inspection metrics in the user interface.

15. The method of claim 14, further comprising:

receiving a selection of a subset of the inspection types;

determining a number of rejections for each inspection metric in each of the selected inspection types;

displaying via the user interface an indication of the number of rejections for each inspection metric and for each of the selected inspection types; and displaying a comparison of rejections for in-house production to outsourced production.

16. A non-transitory computer readable medium storing machine readable instruction that are executable by a processor to:

receive credentials of a user;

determine a profile for the user based on the credentials, wherein the profile is associated with a plant, inspection lots, batches and materials for the user;

receive input parameters, wherein the input parameters identify a plurality of inspection lots from the inspection lots associated with the profile and the input parameters include a date range for the inspection lots;

generate query parameters based on the input parameters, wherein generating query parameters includes identifying a query parameter comprised of the date range and only display information for inspection lots within the date range;

send a query including the formatted query parameters to a database to retrieve information for the plurality of inspection lots;

display the information for the plurality of inspection lots simultaneously in a scrollable screen via a graphical user interface on a device, wherein the information for the plurality of inspection lots includes for each of the plurality of inspection lots, inspection metrics, expected values for the inspection metrics and measured values for the inspection metrics;

receive, via the user interface, a selection of restricted, rejected or approved for each of the plurality of inspection lots;

send the received selection and timestamp for the selection to the database with the user's digital signature to store the selection and the timestamp in the database with the information for the plurality of inspection lots;

determine whether a rate of batch release matches a production rate; and in response to a determination that the rate of batch release is less than the production rate, generating a notification to the user, wherein the notification to the user is a notification to increase lot inspection rate, display available inspection lots available for release, and display restricted inspection lots that have a number of rejected parameters less than a threshold.

* * * * *